United States Patent Office 3,606,013
Patented Sept. 20, 1971

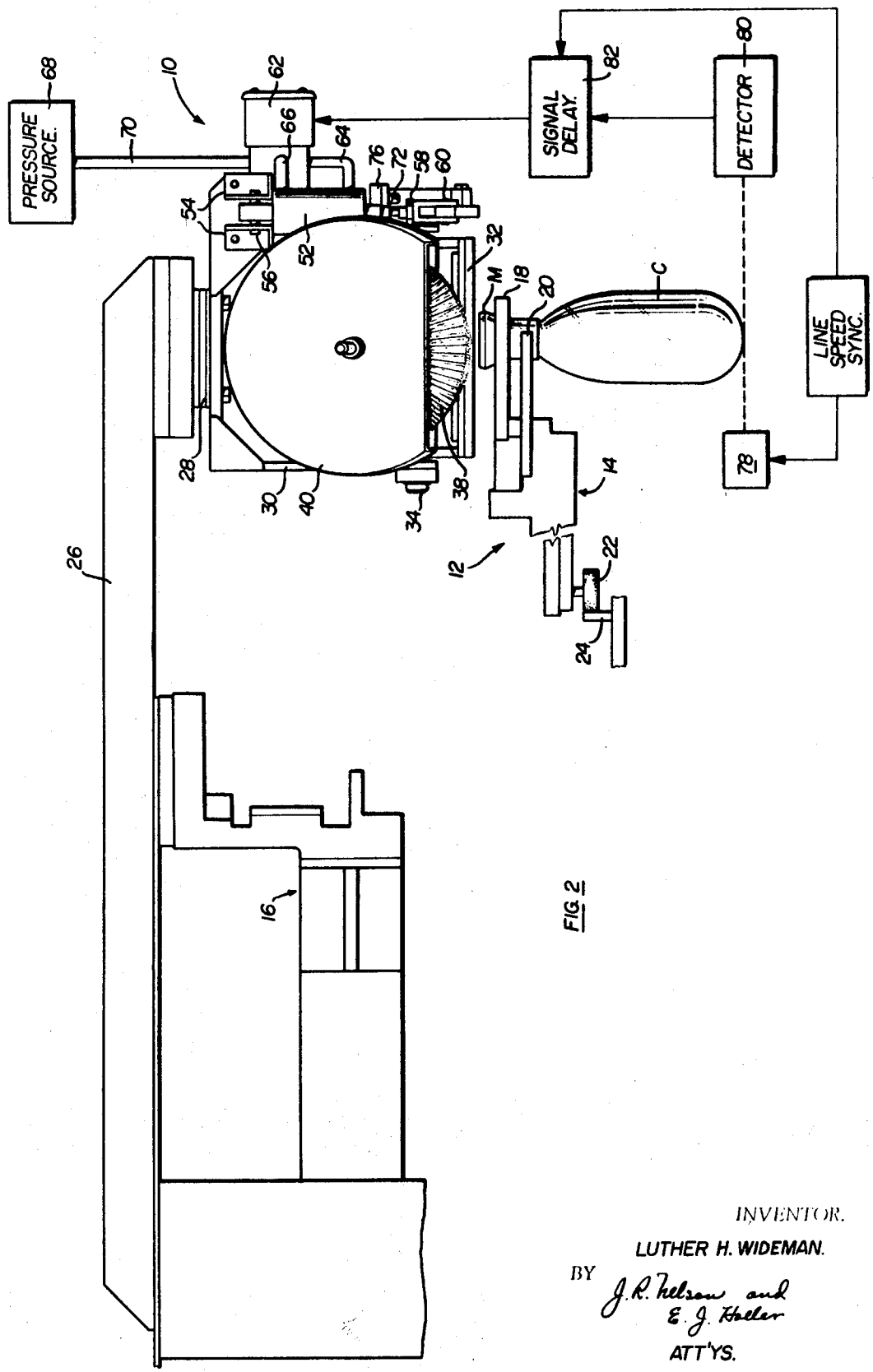

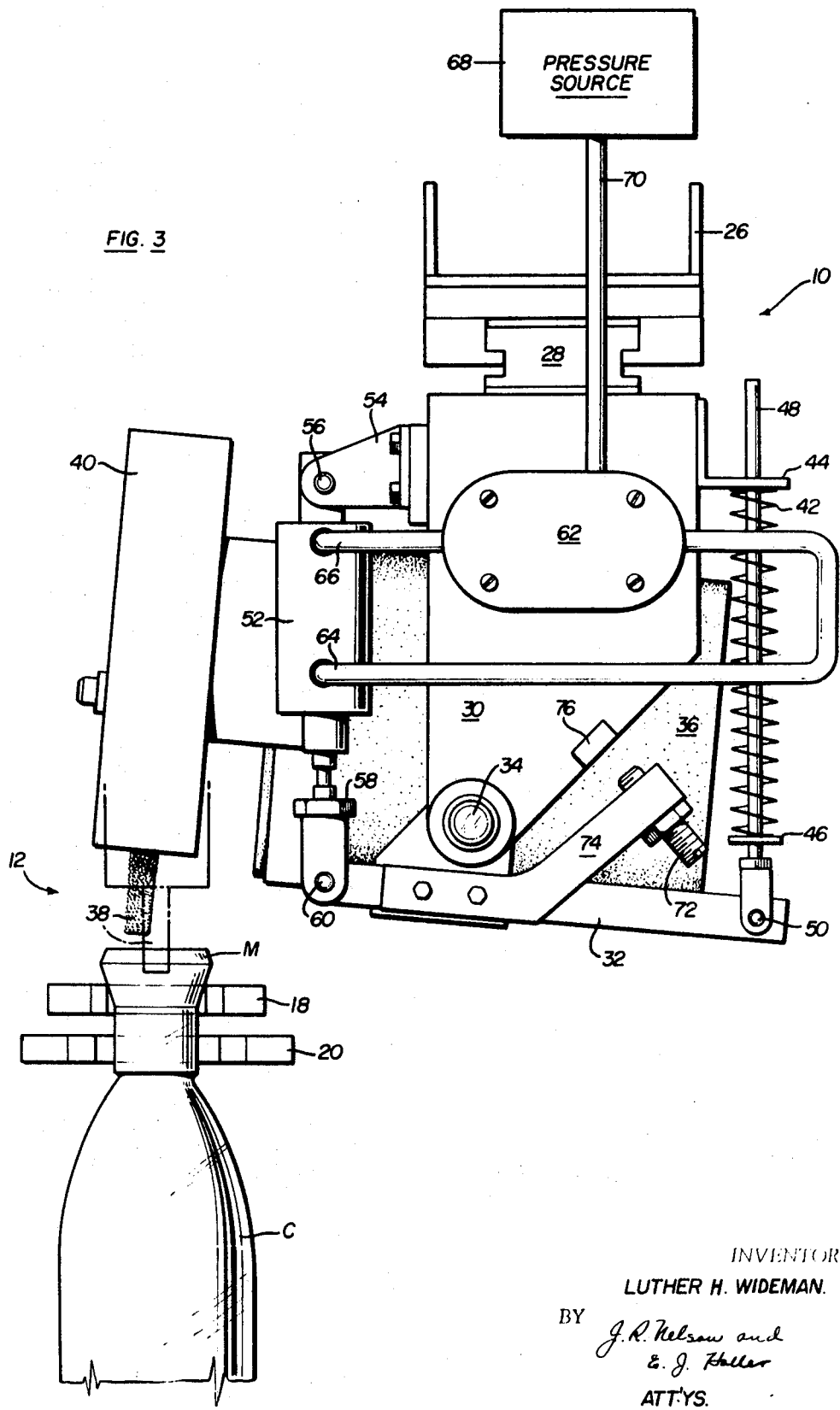

3,606,013
CONTAINER REJECT MECHANISM
Luther H. Wideman, Toledo, Ohio, assignor to
Owens-Illinois, Inc.
Filed Feb. 16, 1970, Ser. No. 11,394
Int. Cl. B07c 3/02
U.S. Cl. 209—74
4 Claims

ABSTRACT OF THE DISCLOSURE

A reject mechanism for ejecting malformed containers from support forks upon which the containers are carried along a container production line. A rotating wire brush is mounted for movement from a normally maintained inactive position clear of the path of movement of containers along the line into an active position at which the brush sweeps a malformed container from its support fork.

BACKGROUND OF THE INVENTION

The reject mechanism of the present invention was especially designed for use with container transfer machines in which the container is carried upon a support fork. One example of such a machine is the transfer machine disclosed and claimed in the copending application of John D. Banyas, Ser. No. 825,850, filed May 19, 1969 and assigned to the assignee of the present application. In the Banyas transfer machine, a fork-like support element is moved into supporting engagement beneath an outwardly bulged moil portion of a container as the container is separated or cracked off from a container forming ribbon machine. The container is transferred by the transfer machine to a burn-off machine on which the container is recived from the transfer machine in an upright position in a chuck having three gripping fingers symmetrically spaced about a chuck seat upon which the container bottom is rested. In the transferring of the container from the transfer machine to the burnoff machine chuck, the support fork on the transfer machine is lowered to lower the container until the container bottom is engaged by the seat on the chuck. Further lowering movement of the support fork disenages the fork from the container so that the fork can be withdrawn.

From the foregoing, it is believed apparent that to properly transfer the container from the transfer machine to the burn-off machine chuck requires the container bottom to be of a normal configuration. Because the container is received by the transfer machine directly from the forming machine, it may be expected that under normal production conditions, a certain percentage of malformed containers will occur, and that of these malformed containers, at least some will have a defect in the container bottom so that a normal transfer of the container to the burn-off machine chuck cannot be accomplished.

To enable the freshly formed container to be handled by the transfer machine without marring the container, an upwardly and outwardly inclined moil portion is formed integral with the container and extends upwardly from the container mouth or finish. The support fork of the transfer machine is of a generally U-shaped configuration, the open end of the fork facing outwardly of the path of travel of the fork on the transfer machine. In receiving the container from the ribbon forming machine, the fork is projected outwardly from the transfer machine into underlying relationship with the outwardly inclined moil on the container so that when the moil is cracked off from the ribbon machine, the container drops until the outwardly bulged moil engages the opposed fingers of the support fork. Thus, the container is engaged by the support fork only at the moil portion, with a portion of the moil projecting upwardly above the support fork.

Because the fingers of the support fork extend transversely across the path of travel of the container, the container can be ejected from the transfer machine only by forcing or driving the container transversely of its path of movement toward and beyond the open end of the fork. The particular production line is intended to operate at speeds of approximately 600 or more containers per minute, and thus any reject mechanism must be capable of rapid operation.

SUMMARY OF THE INVENTION

The reject mechanism of the present invention takes the form of a circular wire brush continuously driven in rotation by an electric motor. The motor is mounted upon a cradle which in turn is mounted for pivotal movement about a horizontal axis upon a stationary support frame. The cradle is supported by the support frame above the path of movement of the support forks of the transfer machine with the pivot axis of the cradle extending in a direction perpendicular to the path of movement of the support forks and also perpendicular to the axis of rotation of the brush. The cradle is normally biased, by a spring, to an inactive position in which the brush is maintained clear of the path of movement of the moils of the containers on the support forks of the transfer machine. A pneumatic motor coupled between the support frame and cradle can be actuated to pivot the cradle into a position such that when the brush is moved to its active position, it sweeps the moil clear outwardly beyond the open end of the support fork.

The pneumatic motor is actuated by a control system which includes an inspection station at a location upstream of the container path from the reject mechanism. The inspection station consists of a more or less conventional inspection device operable to generate a signal in response to the presence of a container having an overall length less than a predetermined minimum length. The reject signal is passed through a signal delay device which delays actuation of the pneumatic motor for the period of time required for the malformed container to travel from the inspection station to the reject station.

Other objects and features of the invention will become apparent by reference to the following specification and to the drawings.

In the drawings:

FIG. 2 is an end view of the reject mechanism of FIG. 1; and

FIG. 3 is a side elevational view of a portion of the apparatus of FIG. 1.

Figure 1:
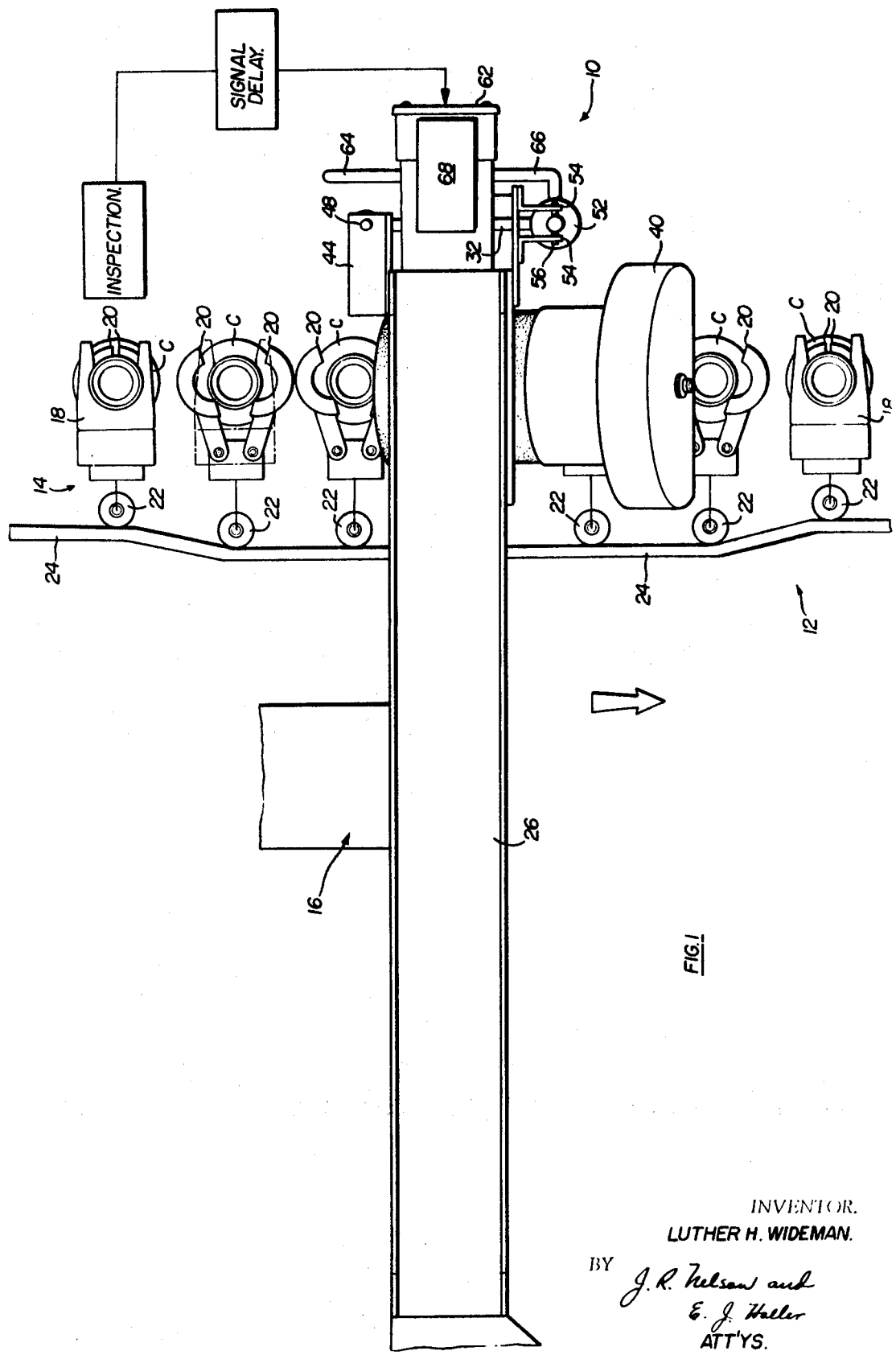
FIG. 1 is a top plan showing a portion of a transfer machine with a reject mechanism embodying the present invention mounted thereon.

In the drawings, a reject mechanism designated generally 10 is mounted upon a transfer machine designated generally 12 which, for the purposes of the present disclosure, will be identified as the transfer machine disclosed in the commonly owned copending application of John D. Banyas, Ser. No. 825,850, filed May 19, 1969.

In the Banyas transfer machine, a plurality of individual transfer heads designated generally 14 are linked together into an endless chain and are driven in continuous movement along a generally rectangular endless path upon the transfer machine frame 16. Each of the transfer heads 14 includes a generally U-shaped support fork 18 which opens outwardly of the path of movement of the transfer head and is adapted to supportingly engage an outwardly inclined or bulged moil portion M integrally formed with and projecting upwardly from a glass container C. Because the containers C, while being carried by the transfer heads, pass around two corners of the endless rectangular path of heads 14, each head 14 also includes a pair of retainer fingers 20 which can be opened or closed by the inter-engagement between a roller 22 mounted upon head 14 and a cam track 24 mounted upon frame 16 of the transfer machine. Fingers 20 are maintained in a closed position while the heads are passing around the corners of the endless path to prevent the containers from being centrifugally flung clear of support forks 18. Because it is necessary that the fingers 20 be open to permit the reject mechanism 10 to operate, cam track 24 is appropriately formed, as shown in FIG. 1, to maintain fingers 20 open as they pass reject mechanism 10. Further details of the structure and operation of the transfer machine 12 and heads 14 may be found in the aforementioned copending Banyas application Ser. No. 825,850.

Reject mechanism 10 includes a support arm 26 which is fixedly mounted upon frame 16 of the transfer machine to project outwardly over the path of movement of heads 14. At the outer end of arm 26, a support yoke 28 having a pair of spaced downwardly projecting support arms 30 is fixedly secured to the underside of arm 26. A cradle 32 is supported from the lower ends of arm 30 for pivotal movement about a horizontal axis by pivot pin assemblies 34. An electric drive motor 36 is fixedly mounted on cradle 32 and is employed to drive a circular wire brush 38 in a counterclockwise direction as viewed in FIG. 2. Brush 38 is mounted directly upon the shaft of motor 36 and, with the exception of its exposed lower portion, is enclosed within a shroud 40 fixedly mounted upon the motor casing.

Cradle 32 and motor 36 are normally maintained in an inactive position shown in full line in FIG. 3 by a compression spring 42 engaged between a bracket 44 fixedly mounted upon yoke 28 and a nut-washer assembly 46 adjustably mounted upon a rod 48 whose lower end is pivotally coupled to cradle 32 as at 50. The upper end of rod 48 is slidably received in bracket 44.

Cradle 32 and motor 36 may be shifted from the inactive full-line position of FIG. 3 in a clockwise direction about pivot 34 by actuation of a pneumatic motor 52. The cylinder of motor 52 is mounted upon a bracket 54 fixed to yoke 28 by a pivot pin 56 while its piston rod 58 is pivotally coupled to cradle 32 as at 60. Actuation of motor 52 is controlled by a conventional four-way reversing valve 62 mounted upon support yoke 28, valve 62 being operatively connected to motor 52 via rod end and head end conduits 64 and 66, while air under pressure is supplied to valve 62 from a schematically illustrated pressure source 68 (FIG. 2) via a supply conduit 70.

Clockwise pivotal movement of cradle 32 about pivot 34 is limited by the engagement between an adjustable stop screw 72 mounted on an arm 74 fixed to cradle 32 and an abutment lug 76 on the outer support arm 30. This adjustment is set to limit the downward movement of the lower peripheral portion of brush 38 to approximately the broken line position of FIG. 3 at which the brush will intercept the path of movement of the upper portion of the moil M of a container, and at which the brush is maintained clear of the path of movement of support forks 18.

In its normally intended use, the reject mechanism described thus far is controlled by an inspection device which inspects the containers and, upon the detection of malformed container, actuates valve 62 to shift the reject mechanism to its active position at the appropriate time to eject the malformed container from its support fork. The particular inspection performed, and thus the particular type of inspection device employed, can vary widely, depending on the station on the production line at which it is desired to inspect the container. For this reason, the inspection station and control of valve 62 are illustrated only schematically and described only in general terms, because such devices and control systems are well-known in the art, and the specific components will be selected in accordance with the requirements of the particular inspection to be performed.

The present invention is concerned with a reject mechanism which is operable to eject glass containers from continuously moving support forks which extend transversely across the direction of travel of the containers, and in which the reject mechanism is operable in response to a signal from an inspection system which may take any of several conventional forms.

In the particular application shown in the drawings, the function of transfer machine 12 is to transfer the containers to a burn-off machine having a container receiving chuck constructed in a fashion such that the bottom of the container being transferred must be of normal configuration in order to be properly received by the burn-off machine chuck. Transfer machine 12 receives the containers directly from the container forming machine by shifting the support fork into underlying relationship with the integral moil M, and thus containers with malformed bottoms, or even containers without bottoms, can be received from the forming machine by transfer machine 12 in exactly the same manner as containers with bottoms of normal configuration. The details of the manner in which the containers are received by transfer machine 12 from the container forming machine, and the manner in which the containers are loaded upon the burn-off machine are set forth in the aforementioned Banyas application Ser. No. 825,850.

In this particular environment, it is desired to inspect the container, during its passage through transfer machine 12, in order to eject those containers which are malformed in a manner such that they cannot be properly transferred to the burn-off machine chucks. One such inspection which might be performed is that of inspecting the container to make sure that the axial length of the container is of at least a minimum length to assure proper transfer. In FIG. 2, one form of inspection system for accomplishing this purpose is schematically illustrated.

In FIG. 2, a light source 78 is intermittently operated to project a light beam laterally across the path of travel of containers on transfer machine 12 at an elevation such that the light beam will be interrupted by the bottom of a container, if the container is of at least the minimum desired length. Intermittent operation of the light beam is synchronized with the line speed and spacing of successive containers along the line such that the light source is energized momentarily at a point of time when a container is or should be between the light source 78 and the photoelectric detection element 80 of the inspection station. Detection elements of this type are commercially available and operate to generate an electric signal upon the detection of light from source 78.

In the usual case, the inspection will be performed at some location upstream of the path of movement of the containers from the rejection station, and thus the electric signal generated by detector 80 in response to a malformed container is passed into a signal delay device 82, preferably in the form of an electronic shift register—see for example Bulletin A–138, Rev. 1 of Farmer Electric Products Co., Inc. of Natick, Mass.—which transmits the signal to valve 62 at the appropriate time to shift cradle 32 and rotary brush 38 into the active position to sweep the malformed container clear of its support fork.

In the usual case, the reject signal generated by detector 80 and transmitted to valve 62 by the shift register 82 is an electric signal, and in this case valve 62 will take the form of a solenoid actuated valve which, when the solenoid is de-energized, will connect pressure source 68 to rod end conduit 64 of motor 52 and at the same time vent head end conduit 66 to thereby position piston rod 58 of motor 52 in its retracted position which, with the assistance of spring 42, maintains cradle 32 and brush 38 in the inactive position shown in full line in FIG. 3. Upon energization of the valve solenoid, by receipt of a reject signal from detector 80 in shift register device 82, the energized solenoid shifts valve 62 to connect head end conduit 66 to presure source 68 while simultaneously venting rod end conduit 64. This connection causes piston rod 58 to be extended, thus driving cradle 32 and brush 38 to the active position at which the rotating brush 38 is operable to sweep the malformed container clear of support fork 18.

All of the components described generally above, such as the solenoid control four-way reversing valve 62, intermittent light source 78, detector 80 and shift register device 82 are commercially available and of conventional construction.

In a glass container production line, such as the present one, it is usually desirable to employ a signal delay device such as shift register 82 so that the inspection elements can be spaced from the reject location in order to avoid exposure of the inspection devices to glass fragments caused by breakage during the rejecting operation. This breakage problem is also the reason for shroud 40 which is employed to prevent glass fragments from being flung by the rotating brush back toward the transfer machine.

To summarize the overall operation of the mechanism, transfer machine 12 is driven to convey containers C in continuous movement past the reject station at which reject mechanism 10 is located. Roller 36 is continuously driven to drive circular wire brush 38 in rotation in a direction such that the lower peripheral portion of the brush moves outwardly of the path of movement of the containers on support forks 18.

Four-way reversing valve 62 is normally positioned to connect pressure source 68 to rod end conduit 64 and to vent head end conduit 66 to thereby establish piston rod 58 of motor 52 in its retracted position. This maintains cradle 32, upon which motor 36 is mounted, in the inactive position shown in full line in FIG. 3, at which the rotating brush 38 is maintained clear of the path of movement of the upwardly projecting moil portions M on support forks 18. Motor 52 is assisted in maintaining cradle 32 and motor 36 in the inactive position shown in full line in FIG. 3 by the biasing action of spring 42. Spring 42 acts in compression and its compressive force is adjusted by nut 46 so as to slightly overbalance cradle 32 about pivots 34 to the inactive position—that is spring 42 will maintain cradle 32 and motor 36 in the inactive position without the assistance of pneumatic motor 52. The spring acts as a safety device to hold the brush in its inactive position in the event of a power or air supply failure. Shifting of the brush in either direction is under the control of motor 52. This enables a rapid shifting of the mechanism between its inactive and active positions. The ability to shift the mechanism rapidly between the inactive and active positions is required by the relatively high line speed at which transfer machine 12 is operated. In its intended mode of operation, transfer machine 12 may advance up to 600 containers per minute past the reject mechanism, hence in order to operate effectively the mechanism must be capable of shifting from its inactive to active position and return to the inactive position rapidly.

As described above, motor 52 is operated to shift the mechanism between its active and inactive position under the control of four-way reversing valve 62 which connects motor 52 to pressure supply source 68 and to a vent in a conventional manner. Control of valve 62 in turn is accomplished by a container inspection system which may take any of several variant forms. For purposes of the present invention, the sole requirement of whatever inspection system is employed is that the inspection system provide to valve 62 a signal operable to shift the valve at the appropriate time to move the rotating brush 38 into the path of movement of the moil M of the malformed container to sweep the container clear of the support fork and to retract brush 38 to its inactive position before the arrival of the next container. The inspection device may operate valve 62 to hold it in position for maintaining rotating brush 38 in its active position for rejecting a succesion of containers. For example, if two or more succesive containers inspected by the device are found defective, there is no necessity to cycle the rotating brush between its active and inactive positions for each of these containers. By maintaining the brush active under control of the inspection system and valve 62, the succession of defective containers will be ejected from transfer machine support forks 18. When a good container is next presented by the conveyor, valve 62 will then shift to return the brush to inactive position.

The ejected containers are collected in a cullet chute, not shown, which returns the ejected containers as cullet to the glass furnace.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. For use in combination with a container transfer apparatus wherein containers are individually supported upon generally U-shaped support forks, each fork being engaged beneath an outwardly bulged portion of the container, said transfer apparatus having means for driving said forks in succession along a first path with the open ends of the forks facing outwardly of said first path: reject means operable to eject a container from said apparatus at a reject station on said first path comprising a support frame located adjacent said first path, rotary brush means including a brush mounted upon said support frame for movement between a first position clear of the path of movement of containers along said first path and a second position wherein a lower portion of said brush is engageable with that portion of the container projecting above its support fork when the container is at said reject station, means for driving said brush in rotation about an axis extending longitudinally above said first path and in a rotary direction wherein the lower portion of the brush moves outwardly of said first path when said brush is in said second position, biasing means normally maintaining said brush in said first position, and control means operable to shift said brush to said second position.

2. The invention defined in claim 1 wherein said brush means comprises a cradle, means mounting said cradle on said support frame for pivotal movement about a horizontal axis normal to said first path, said brush driving means comprising a motor fixedly mounted on said cradle for pivotal movement therewith and having a rotating drive shaft, means mounting said brush on said drive shaft, and said biasing means comprises spring means engaged between said support frame and said cradle pivotally biasing said cradle to an inactive position wherein said brush is located in said first position.

3. The invention defined in claim 1 wherein said control means comprises motor means operable to shift said brush between said first and said second positions, motor control means for operating said motor means to normally locate said brush in said first position and actuable to operate said motor means to shift said brush to said second position.

4. The invention defined in claim 3 wherein said rotary brush means comprises a constantly driven drive motor having a rotary drive shaft, means mounting said brush on said drive shaft, pivot means mounting said drive motor on said support frame for pivotal movement about a horizontal axis normal to said first path between an inactive position wherein said brush is in said first position and an active position wherein said brush is in said second position, said motor means and said biasing means being both coupled between said support frame and said drive motor.

References Cited
UNITED STATES PATENTS

| | | | |
|---|---|---|---|
| 931,993 | 8/1909 | Cary | 209—91 |
| 3,471,012 | 10/1969 | Calhoun | 209—74 |

RICHARD A. SCHACHER, Primary Examiner

U.S. Cl. X.R.

198—185; 209—91